(12) United States Patent
Brewer et al.

(10) Patent No.: US 9,151,428 B2
(45) Date of Patent: Oct. 6, 2015

(54) LOAD LINE CONNECTION SPILLAGE CONTAINER

(71) Applicant: ANTI-POLLUTION TECHNOLOGY, L.P., Frisco, TX (US)

(72) Inventors: Jack G Brewer, Chickasha, OK (US); Steven L Shroyer, Redondo Beach, CA (US); Darrel B Fruit, Oklahoma City, OK (US); Darrel G Fruit, Chickasha, OK (US)

(73) Assignee: Anti-Pollution Technology, L.P., Frisco, TX (US)

( * ) Notice: Subject to any disclaimer, the term of this patent is extended or adjusted under 35 U.S.C. 154(b) by 309 days.

(21) Appl. No.: 13/750,704

(22) Filed: Jan. 25, 2013

(65) Prior Publication Data

US 2013/0134172 A1   May 30, 2013

Related U.S. Application Data

(63) Continuation of application No. 13/082,782, filed on Apr. 8, 2011, now abandoned, which is a continuation of application No. 12/660,260, filed on Feb. 23, 2010, now Pat. No. 7,921,884, which is a continuation of application No. 12/259,577, filed on Oct. 28, 2008, now Pat. No. 7,673,658.

(51) Int. Cl.
```
F16L 55/00      (2006.01)
B08B 17/00      (2006.01)
B08B 17/02      (2006.01)
```
(52) U.S. Cl.
CPC ............... *F16L 55/00* (2013.01); *B08B 17/00* (2013.01); *B08B 17/025* (2013.01); *Y10T 137/5762* (2015.04)

(58) Field of Classification Search
CPC ........ F16L 55/00; B08B 17/00; B08B 17/025
USPC ........... 141/86, 88, 89, 311 A, 367; 220/533, 220/542, 571; 137/312, 313, 314; 222/108–111; 184/106
See application file for complete search history.

(56) References Cited

U.S. PATENT DOCUMENTS

| | | |
|---|---|---|
| 441,141 A | 11/1890 | Dalton |
| 2,438,245 A | 3/1948 | Gregg |

(Continued)

OTHER PUBLICATIONS

Defendant's Motion for Partial Summary Judgment—U.S. District Court for the Western District of Oklahoma, Case No. 5:11-cv-00494-R, Doc. No. 46, Oct. 3, 2012. See pages pp. 14-18 (as indicated at bottom of page); See Exhibit 11—Pollution Control Corporation website dated Apr. 22, 1999 depicting Pollution Control Corporation's 300 series load line containment unit.

(Continued)

*Primary Examiner* — Timothy L Maust
(74) *Attorney, Agent, or Firm* — McAfee & Taft, PC

(57) ABSTRACT

An injection-molded load line connection spillage container for catching and retaining liquid spilled when liquids are pumped between storage tanks and tankers provides an injection-molded reservoir and an injection-molded cover attached to the reservoir by hinges. Reinforcing ribs molded into the reservoir provide strength and ruggedness without the need for reinforcing steel collars and saddles. Gussets molded into the reservoir hinge brackets ensure repeated stresses produced by energetic opening of the cover does not result in failure of the hinge brackets. An optional load line mounting assembly permits secure mounting of the load line container directly onto the load line. An optional cleanout assembly provides a valved suction line for removing retained spillage, and an optional sampling assembly provides a valved sample line for sampling the liquid being transferred.

17 Claims, 7 Drawing Sheets

(56) References Cited

U.S. PATENT DOCUMENTS

| | | | |
|---|---|---|---|
| 2,497,969 A | | 2/1950 | Anderson |
| 2,954,797 A | | 10/1960 | Dryer |
| 3,047,190 A | * | 7/1962 | Bayer ................... 220/646 |
| 3,110,157 A | | 11/1963 | Radd |
| 3,434,625 A | * | 3/1969 | Embry, Jr. ............ 220/495.06 |
| 3,562,969 A | | 2/1971 | Little, Jr. |
| 3,871,401 A | | 3/1975 | Lyons |
| 4,653,312 A | * | 3/1987 | Sharp ...................... 588/259 |
| 4,819,677 A | | 4/1989 | Stern |
| 4,871,084 A | * | 10/1989 | Robbins ................... 137/363 |
| 4,896,705 A | | 1/1990 | Podgers et al. |
| 4,912,966 A | | 4/1990 | Sharp |
| 4,960,346 A | | 10/1990 | Tamayo |
| 5,002,101 A | | 3/1991 | McLeod |
| 5,031,796 A | | 7/1991 | Schafer et al. |
| 5,058,633 A | | 10/1991 | Sharp |
| 5,060,509 A | | 10/1991 | Webb |
| 5,071,166 A | | 12/1991 | Marino |
| 5,101,869 A | | 4/1992 | Myers |
| 5,105,947 A | * | 4/1992 | Wise ....................... 206/519 |
| 5,152,635 A | | 10/1992 | Ziu |
| 5,313,991 A | | 5/1994 | Murray et al. |
| 5,361,931 A | | 11/1994 | VanLandingham |
| 5,373,961 A | | 12/1994 | Harris et al. |
| 5,379,810 A | | 1/1995 | Marino |
| 5,511,279 A | * | 4/1996 | Ippolito .................. 15/257.06 |
| 5,511,573 A | | 4/1996 | Corta |
| D374,447 S | | 10/1996 | Brewer |
| D380,814 S | | 7/1997 | Brewer |
| 5,647,412 A | * | 7/1997 | Brewer ...................... 141/86 |
| 5,806,702 A | * | 9/1998 | Sabo ........................ 220/4.12 |
| 7,637,387 B1 | * | 12/2009 | Cantolino .................. 220/571 |
| 7,673,658 B1 | * | 3/2010 | Brewer et al. .............. 141/86 |
| 7,921,884 B2 | * | 4/2011 | Brewer et al. .............. 141/86 |
| 2006/0157112 A1 | | 7/2006 | Brewer et al. |

OTHER PUBLICATIONS

Plaintiffs Response to Motion for Partial Summary Judgment—U.S. District Court for the Western District of Oklahoma, Case No. 5:11-cv-00494-R, Doc. No. 53, Oct. 24, 2012. See pp. 25-26 (as indicated at bottom of page); See Exhibit 1—Declaration of Expert Steven Tipton, pp. 8-9 beginning at paragraph No. 51; and Exhibit 28 (Marked Ex. 27)—Declaration of Jack Brewer.

Defendant's Amended Motion for Partial Summary Judgment—U.S. District Court for the Western District of Oklahoma, Case No. 5:11-cv-00494-R, Doc. No. 67, Nov. 21, 201. See pp. 18-19 (as indicated at bottom of page); See Exhibit 9—Pollution Control Corporation website dated Apr. 22, 1999 depicting Pollution Control Corporation's 300 series load line containment unit); and Exhibit 10—Photographs of Pollution Control Corporation's 300 series load line containment unit referred to in Exhibit 9.

Plaintiffs Response to Amended Motion for Partial Summary Judgment—U.S. District Court for the Western District of Oklahoma, Case No. 5:11-cv-00494-R, Doc. No. 72, Dec. 12, 2012. See pp. 26-30 (relevant pages (as indicated at bottom of page). See Exhibit 1—Declaration of Expert Steven Tipton pp. 8-9 beginning at paragraph No. 51; and Exhibit 28 (labeled as Exhibit 27)—Declaration of Jack Brewer.

Briefing and Court Order on Claim Construction—U.S. District Court for the Western District of Oklahoma, Case No. 5:11-cv-00494-R, Doc. Nos. 26, 27, 29, 30, 33, Mar.-Apr. 2012.

Screen shot of pollutioncontrolcorp.com depicting PCC 300 series load line containment unit, Apr. 22, 1999.

* cited by examiner

LOAD LINE CONNECTION SPILLAGE CONTAINER

CROSS REFERENCE TO RELATED APPLICATIONS

The present application is a continuation of U.S. patent application Ser. No. 13/082,782 for Load Line Connection Spillage Container filed Apr. 8, 2011, which is a continuation of U.S. patent application Ser. No. 12/660,260 filed Feb. 23, 2010 now U.S. Pat. No. 7,921,884 which is a continuation of U.S. patent application Ser. No. 12/259,577 filed on Oct. 28, 2008 now U.S. Pat. No. 7,673,658.

BACKGROUND OF THE INVENTION

1. Field of the Invention

This invention relates generally to containment of oil, waste, and chemical spills, and more particularly, to a container for containing spillage at a load line connection. As used herein, the terms "load line connection spillage container," "load line spillage container," and "load line container" refer, interchangeably, to applicants' invention.

2. Discussion

Environmental concerns require containment of oil, waste, and other chemical spills from pipelines, storage tanks, tanker trucks, and railroad tankers. Pollution occurring when liquids are transferred between storage tanks and tanker vehicles through transfer lines is a continuing concern. Although transfer lines occasionally fail, leakage more typically occurs where the line from the tanker truck or railroad tanker attaches to the storage tank unloading line. The transfer lines are normally equipped with quick connect fittings, but spillage can occur during connection and disconnection of the transfer lines.

U.S. Pat. No. 5,313,991 is directed to an oil and waste line connection spillage containment apparatus (also referred to herein as a "load line container") constructed from non-corrosive and rustproof materials. A substantially cylindrical container has two openings for receiving oil and waste loading and unloading lines therein. The lines are connected within the container. A circular cover encloses the container and is fastened and unfastened from the container using a pair of L-shaped members. Any oil and waste spilled from the connection is removed from the container when the lines are disconnected. In the alternative, a removal line with an auxiliary valve is used to withdraw the oil and waste from the container through the loading line. When the unloading line is removed from the opening in the container, a vented plug is inserted into the opening.

U.S. Pat. No. 5,647,412 is also directed to an apparatus for containing oil and waste spillage at a line connection. A load line container has opposed sidewall openings which receive loading and unloading lines, respectively, which are coupled within the container. Any spillage from the ends of the lines and the line connection is retained within the container. A lid closes the top end of the container when the unloading line is removed from the apparatus. With the unloading line removed from the container and the lid closed, an extension member attached to the lid covers the sidewall opening that is used for receiving the unloading line within the container.

Load line containers according to U.S. Pat. No. 5,647,412 made from fiberglass, medium density polyethylene, and high density polyethylene have been marketed in the United States and abroad. These load line containers have capacities, i.e., the maximum volume of spillage to be contained, of up to 35 gallons. The weight of the apparatus itself is nominal, but the combined weight of transfer lines and steel couplings associated with the unloading line and transfer lines is significant. In addition, the oil and waste spillage contained within the apparatus can weigh up to about 250 pounds. Finally, the apparatus is typically deployed in remote locations requiring a rugged product able to withstand rough treatment. In the past, steel collars, steel plates, and steel saddles have been used to strengthen the load line containers. It would be highly desirable to have a load line container which is sufficiently rugged for oil field application without the necessity of reinforcing steel collars, plates, and saddles.

What is needed is an injection molded load line container having a structure which is inherently strong and rugged, thereby eliminated the need for reinforcing steel collars, plates, and saddles.

SUMMARY OF THE INVENTION

An injection-molded load line connection spillage container for catching and retaining liquid spilled during transfers of liquids between storage tank and tankers provides an injection-molded reservoir and an injection-molded cover attached to the reservoir by hinges. Reinforcing ribs molded into the reservoir provide the strength and ruggedness required for oil field applications. Gussets molded into the reservoir hinge brackets ensure repeated stresses produced by energetic opening of the cover does not result in failure of the hinge brackets. An optional load line mounting assembly permits secure mounting of the load line container directly onto the load line. An optional cleanout assembly provides a valved suction line for removing retained spillage, and an optional sampling assembly provides a valved sample line for sampling the liquid being transferred. An optional main line valve contained within the load line container provides secure control of transfer between the storage tank and the tankers. An optional flow meter assembly, either in-line or clamped to the exterior of a transfer line, permits measurement of the volume of liquid transferred.

An object of the invention is to provide a rugged corrosion-resistant and wear-resistant container for collecting spillages at load line connections.

Another object of the invention is to provide a load line connection spillage container with a built-in cleanout assembly for removing captured liquids from the container.

Another object of the invention is to provide a load line connection spillage container which can endure the wear and tear associated with oil field operations.

DETAILED DESCRIPTION OF THE INVENTION

In the following description of the invention, like numerals and characters designate like elements throughout the figures of the drawings.

Figure 1:
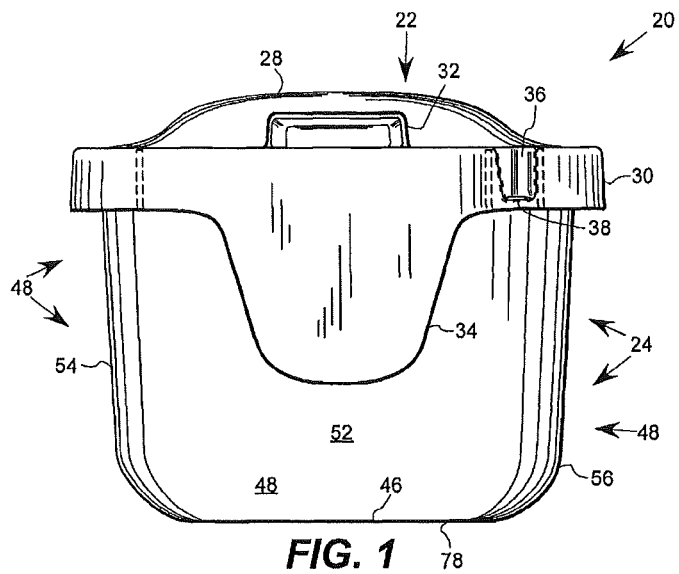
FIG. 1 is a front view of a load line connection spillage container, including a reservoir and a reservoir cover, according to the present invention.
Figure 2:
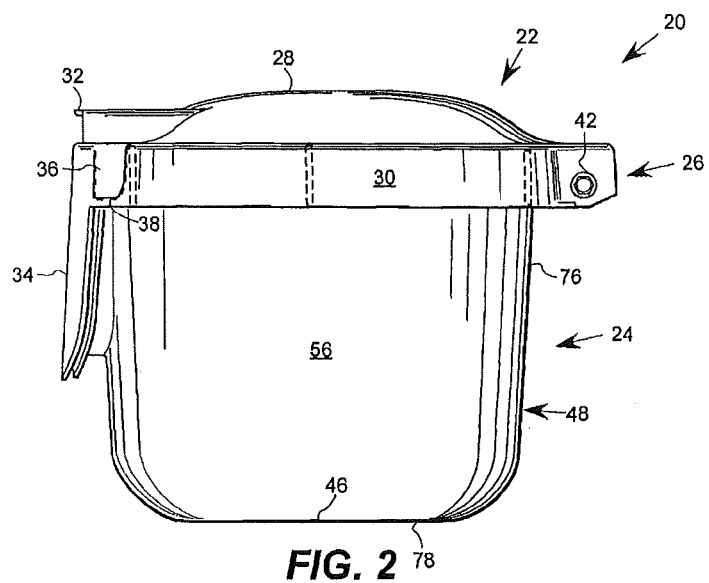
FIG. 2 is a side view of the load line connection spillage container shown in FIG. 1.
Figure 3:
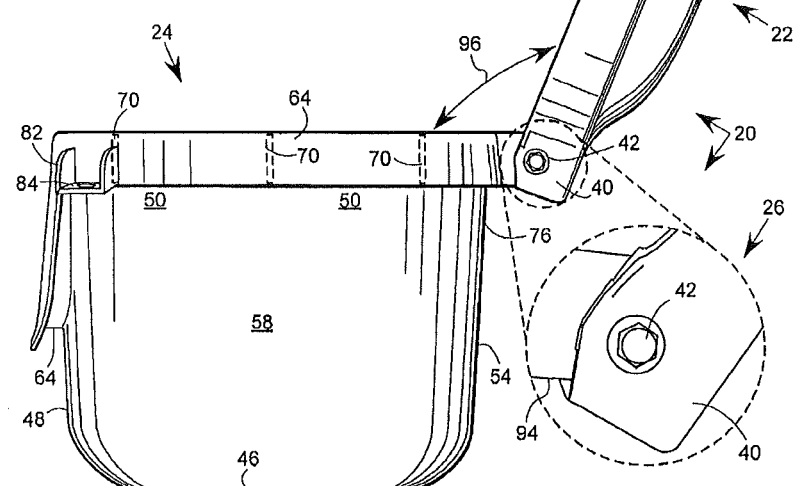
FIG. 3 is a side view, with the reservoir cover open, of the load line connection spillage container shown in FIGS. 1 and 2.

Referring generally to FIGS. 1-3, a load line container 20 has a reservoir cover 22 (also referred to herein as a cover) attached to a reservoir 24 by hinges 26. Typically, the load line container 20 is mounted on a load line (not shown) from a storage tank (not shown). Another line (not shown) extends from a removal source such as a tank truck (not shown) for connection to the loading line within the load line container 20. Thus the load line container 20 provides a point of connection between the loading line (from the storage tank) and the unloading line (from the tank truck). It will be understood by one skilled in the art that, while the present invention is described in the context of transfer of liquid from a storage tank to a removal source such as a tank truck, liquids are also routinely transferred from tank trucks to storage tanks. Thus, whereas the term "loading line" is used herein, for ease of illustration, to indicate the line attached to the storage tank and the term "unloading line" is used, for ease of illustration, to indicate the line attached to a tank truck or other removal source (e.g., a rail car), both "loading lines" and "unloading lines" are liquid transfer lines facilitating flow either to or from a storage facility.

Still referring to FIGS. 1-3, the reservoir cover 22 is generally circular with a central dome portion 28 and a lip 30. A handle 32 adjacent the lip 30 is generally centered over a downwardly projecting arcuate member 34. The downwardly projecting arcuate member 34 and the handle 32 are generally diametrically opposed to the hinges 26. A recess 36 in the lip 30 has a bore 38 therein for receiving a lock (not shown).

Figures 9, 10:
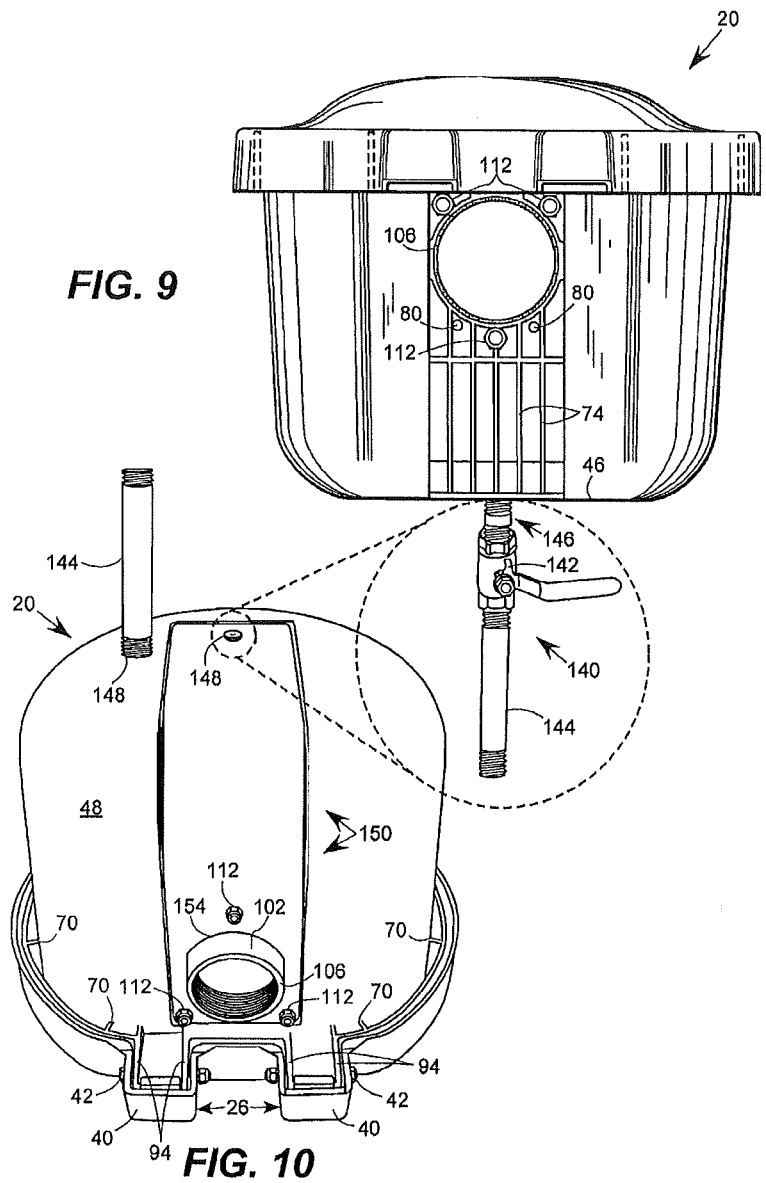
FIG. 9 is a rear view of the load line connection spillage container shown in FIGS. 1-3 and FIG. 7 with an optional bottom drain assembly.
FIG. 10 is a view of the load line connection spillage container according to the present invention, together with the optional bottom drain assembly.
Figure 12:
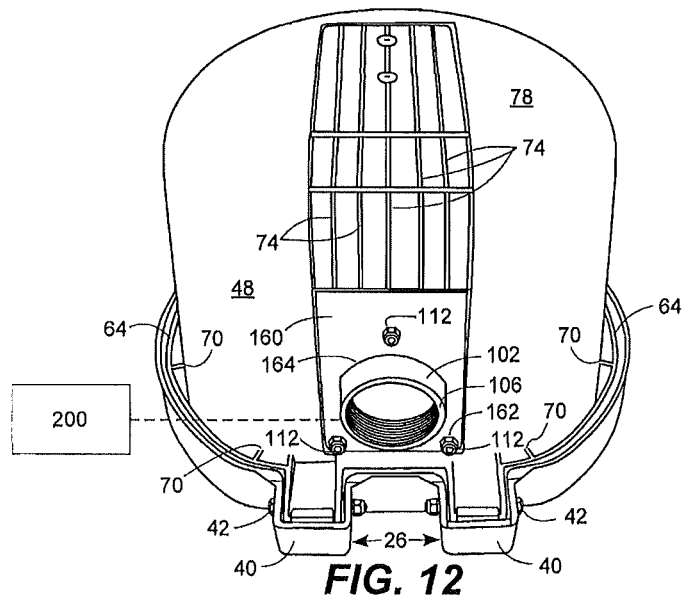
FIG. 12 is a view of another load line connection spillage container according to the present invention.

Referring now to FIG. 3, a pair of reservoir cover hinge members 40 extend outwardly from the lip 30 opposite the handle 32 and the downwardly projecting arcuate member 34. The reservoir cover hinge members 40 and the pair of hinges 26 are shown more clearly in FIG. 10 and FIG. 12. Hinge pins 42 are disposed through bores 44 (not shown) in the cover hinge members 40. In FIGS. 10 and 12, the hinge pins 42 are threaded bolts with self-locking nuts. As will be discussed more fully below, the self-locking nuts prevent access to the load line container 20 by unauthorized personnel.

Figure 4:
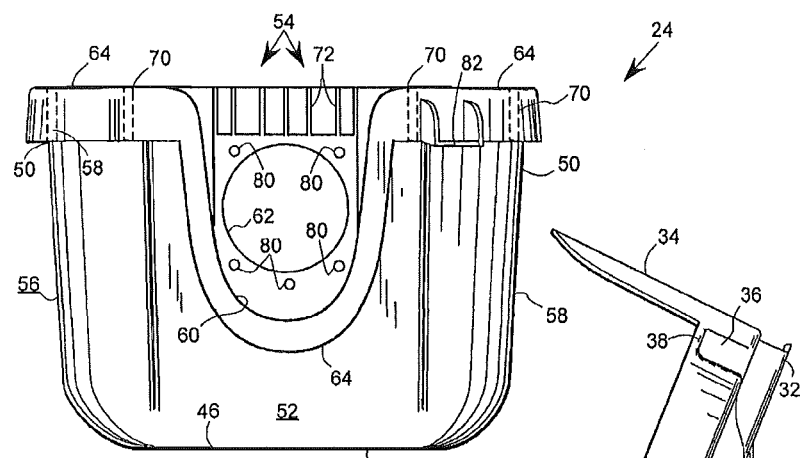
FIG. 4 is a front view, with cover and load line mounting assembly removed, of the reservoir of the load line connection spillage container shown in FIGS. 1-3.
Figure 5:
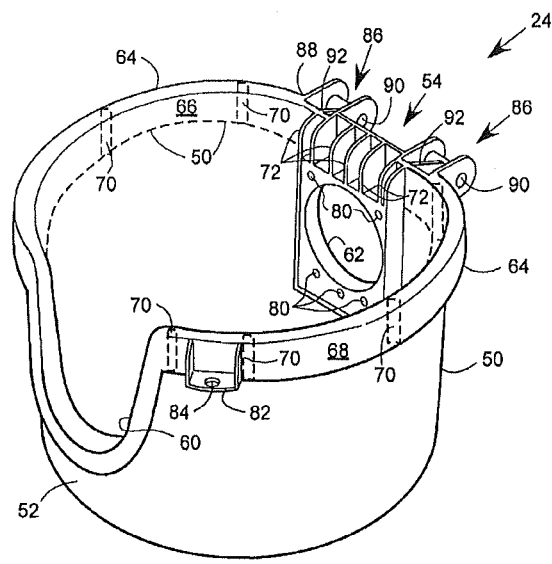
FIG. 5 is another view, with cover and load line mounting assembly removed, of the reservoir of the load line connection spillage container shown in FIGS. 1-3.
Figure 6:
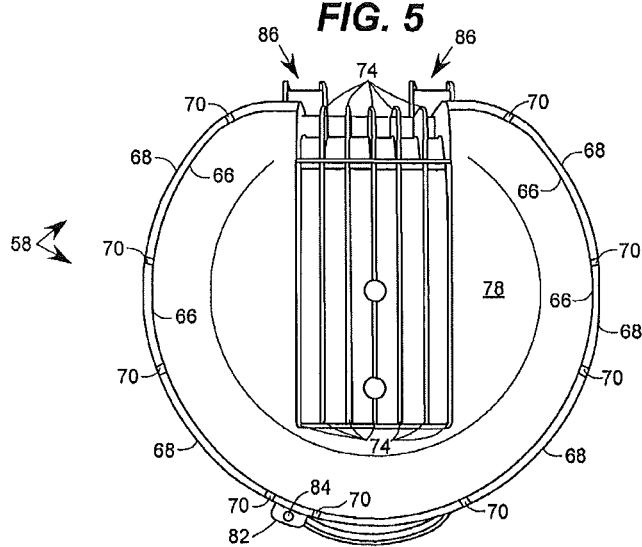
FIG. 6 is a bottom view of the reservoir of the load line connection spillage container shown in FIGS. 1-6.

Referring now to FIGS. 4-6 in conjunction with FIGS. 1-3, the reservoir 24 of the load line connection container 20 has an integrally molded bottom 46 and upstanding side walls 48 defining an open upper end portion 50. The open upper end portion 50 has a front upstanding wall portion 52, a rear upstanding wall portion 54, a left upstanding wall portion 56, and a right upstanding wall portion 58. A transfer line channel 60 located in the front upstanding wall portion 52 is sized to receive a transfer line (not shown). A load line throughway 62 located in the rear upstanding wall portion 54 provides a location for attachment of a load line mounting assembly 100 (See FIGS. 7-8). The upper end portion 50 of the reservoir 24 terminates in an integrally molded J-shaped lip 64 having a sidewall portion 66 and a rollover portion 68. Lip gussets 70 spaced about the circumference of the open upper end portion 50 between the sidewall portion 66 and the rollover portion 68 strengthen the integrally molded J-shaped lip 64 and the open upper end portion 50 of the reservoir 24.

Referring now to FIGS. 4-6, the front channel 60 is positioned opposite the load line throughway 62 located in the rear upstanding wall portion 54. Integrally molded internal reinforcing ribs 72 in the rear portion 54 of the upstanding wall 48 strengthen the rear upstanding wall portion 54 at the point of attachment of the load line connection spillage container 20 to the load line. Integrally molded external reinforcing ribs 74 extend downwardly along the exterior 76 of the rear upstanding wall portion 54 of the reservoir 24 and continue across the exterior 78 of the bottom 46 of the reservoir 24 (See FIG. 6). Bores 80 spaced around the load line throughway 62 are used to attach the load line mounting assembly 100 shown in FIGS. 7-8.

Still referring to FIGS. 4-6, an integrally molded lock bracket 82 projecting outwardly from the J-shaped lip 64 has a bore 84 for receiving a lock (not shown). The lock bracket 82 mates with the recess 36 in the container cover 22 so the bore 38 aligns with the bore 84 in the lock bracket 82 to receive the lock (not shown).

Still referring to FIGS. 4-6 in conjunction with FIG. 2, the integrally molded J-shaped lip 64 extends from one side of the rear upstanding wall portion 54 along the top of the right upstanding wall portion 58, then around the transfer line channel 60 in the front upstanding wall portion 52, and along the top of the left upstanding wall portion 56 to the other side of the rear upstanding wall portion 54. When the reservoir cover 22 is closed on the reservoir 24, as shown in FIG. 2, the cover lip 30 extends downwardly around the upper end portion 50 of the reservoir 24 and the downwardly extending member 34 of the reservoir cover 22 rests against the J-shaped lip 64 along the transfer line channel 60 in the reservoir 24, thereby closing off the transfer line channel 60. Thus the cover 22, in the closed position, prevents accumulation of water, snow, and debris within the reservoir 24. The cover 22 also prevents small animals from gaining access to the reservoir 24. Yet the reservoir 24 is vented to avoid buildup of chemical vapors.

Referring now to FIG. 4, the reservoir 24 is sized based on the volume of spillage to be contained. Likewise, the load line throughway 60 is sized to accommodate the pipe size of the loading line. For large volumes of spillage, the load line connection spillage container 20 can optionally be supported by the ground (with or without a concrete slab) or by a stand used to align the load line throughway 60 with the load line. When so deployed, the bores 80 are unnecessary.

Referring now to FIGS. 5-6, integrally molded reservoir hinge brackets 86 project rearwardly from the top portion 88 of the rear upstanding wall portion 54 of the reservoir 24. Each hinge bracket 86 has a pin bore 90 for receiving a hinge pin 42 (See FIG. 3). Integrally molded gussets 92 reinforce and strengthen the hinge brackets 86. As shown in FIG. 3 (enlarged detail), the reservoir cover hinge members 40 enclose the hinge brackets 86. When the reservoir cover 22 is in the open position, as shown in FIG. 3, the extent to which the reservoir cover 22 will open is limited, by contact of the reservoir cover hinge members 40 with the bottom sides 94 of the hinge brackets 86, to an angle 96 greater than 90 degrees. The integrally molded gussets 92 provide additional strength to what might otherwise be a failure point as the cover is moved from the closed position, as shown in FIGS. 1-2, to the open position illustrated in FIG. 3.

Figures 7, 8:
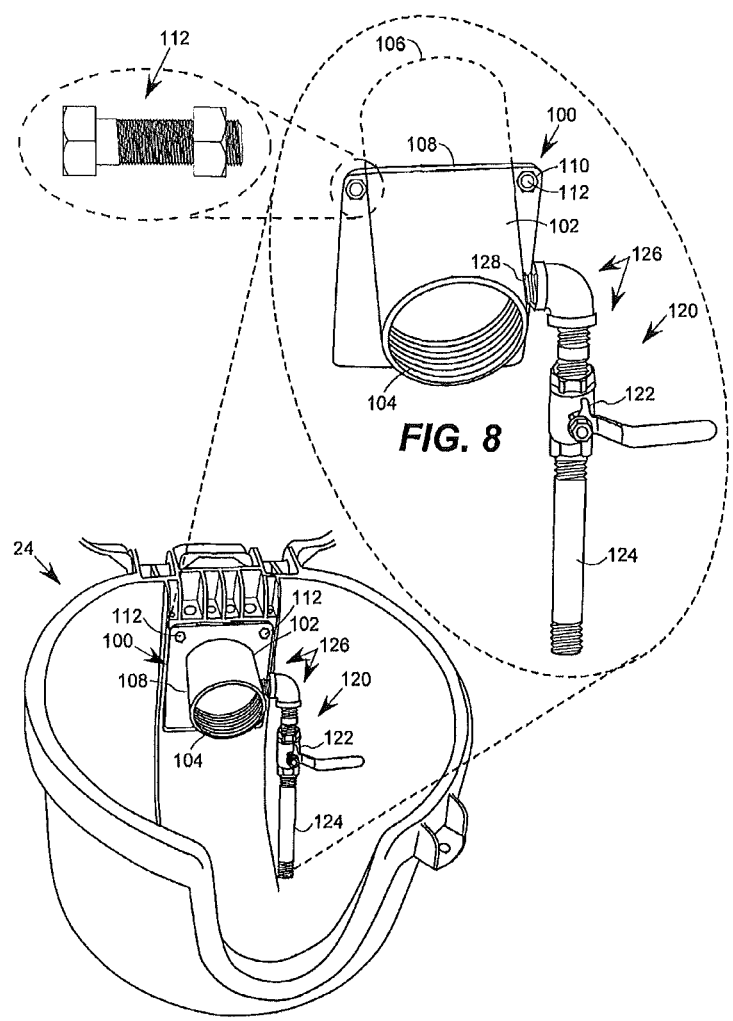
FIG. 7 is a view of the load line connection spillage container shown in FIGS. 1-3 with a load line mounting assembly and an optional clean-out assembly. The load line connection spillage container in FIG. 7 is shown with the reservoir cover partially cut away.
FIG. 8 is an enlarged detail of the load line mounting assembly and the clean-out assembly shown in FIG. 7.

Referring now to FIGS. 7-8, a load line mounting assembly 100 is shown. The load line mounting assembly 100 consists of a length of pipe 102 threaded on each end 104, 106 and a flange 108 located between the ends 104, 106. Flange bores 110 in the flange bores 108 mate with the throughway bores 80 spaced around the load line throughway 62 located in the rear upstanding wall portion 54 of the reservoir 24. Fasteners 112 secure the flange 108 to the rear upstanding wall portion 54. For security, bolts with locking nuts are preferred for the fasteners 112.

Still referring to FIGS. 7-8, an optional cleanout assembly 120 attached to the load line mounting assembly 100 permits evacuation of contents of the reservoir 24 through a transfer line (not shown). A valve 122 connects a suction line 124 to the load line mounting assembly 100 by appropriate pipe fittings 126 through a threaded bore 128 adjacent the threaded end 104 of the length of pipe 102. The suction line 124 is sized to extend from the valve to just above the bottom 46 of the reservoir 24. In operation, while the transfer line is in place and a pump is pulling tank contents into the tank truck, the valve 122 is opened and any liquid which has accumulated in the reservoir 24 will be transferred to the tank truck.

Referring now to FIG. 9, the load line connection spillage container 20 is shown in conjunction with an optional bottom drain assembly 140. A valve 142 is connected at one end by appropriate pipe fittings 146 to the bottom 46 of the reservoir 24. A drain line 144 extends downwardly from the other end of the valve 142. When the valve 142 is opened, any liquid collected within the reservoir 24 of the load line container 20 drains from the reservoir 24 into an appropriate container (not shown).

Referring now to FIGS. 7-9, the advantages of the current invention injection molded load line connection spillage container 20 are apparent. The integrally molded internal reinforcing ribs 72 and the integrally molded external reinforcing ribs 74 permit attachment of the load line connection spillage container 20 to a loading line, using the load line mounting assembly 100, without use of additional steel collars and saddles.

Still referring to FIGS. 9-10, the optional bottom drain assembly 140 permits removal of any liquid which may accumulate in the reservoir 24. A valve 142 connects a drain line 144 to the reservoir 24 by appropriate piping 146 through a threaded bore 148 in the bottom 46 of the reservoir 24. As shown in FIG. 10, the precise location of the threaded bore 148 in the bottom 46 of the reservoir 24 is arbitrary. Any convenient location is within the scope of the present invention.

Figure 11:
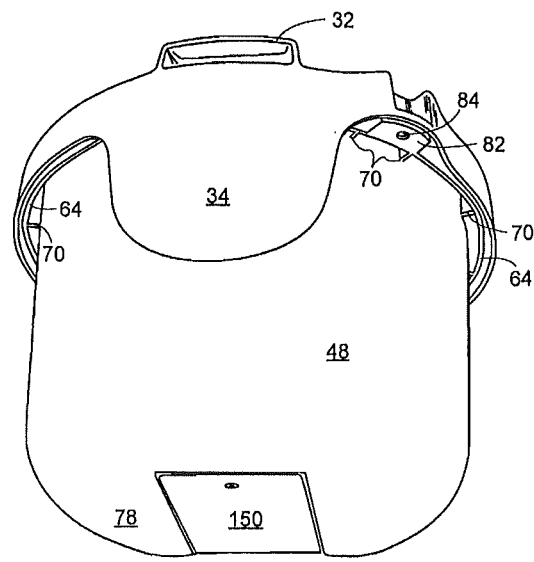
FIG. 11 is another view of the load line connection spillage container shown in FIG. 10 without the optional bottom drain.

Referring again to FIG. 10 in conjunction with FIG. 11, the load line connection spillage container 20 is shown with an optional saddle 150 which extends from the rear upstanding wall portion 54 downward and across the bottom 46 of the reservoir 24. Saddle bores 152 align with the bores 80 spaced around the load line throughway 60, and the saddle 150 is secured by the fasteners 112 used to secure the load line mounting assembly 100 to the rear upstanding wall portion 54 of the reservoir 24. One threaded end 106 of the pipe length 102 of the load line mounting assembly 100 extends through a cutout 154 in the saddle 150.

Referring now to FIG. 12, the load line connection spillage container 20 is shown with an optional backing plate 160. The backing plate 160 has backing plate bores 162 which align with the bores 80 spaced around the load line throughway 60, and the backing plate 160 is secured by the fasteners 112 used to secure the load line mounting assembly 100 to the rear upstanding wall portion 54 of the reservoir 24. One threaded end 106 of the pipe length 102 of the load line mounting assembly 100 extends through a cutout 164 in the backing plate 160.

It will be understood by one skilled in the art that the saddle 150 and the backing plate 160 are primarily cosmetic and not needed to support the weight of the load line connection spillage container 20 and its contents.

Figure 13:
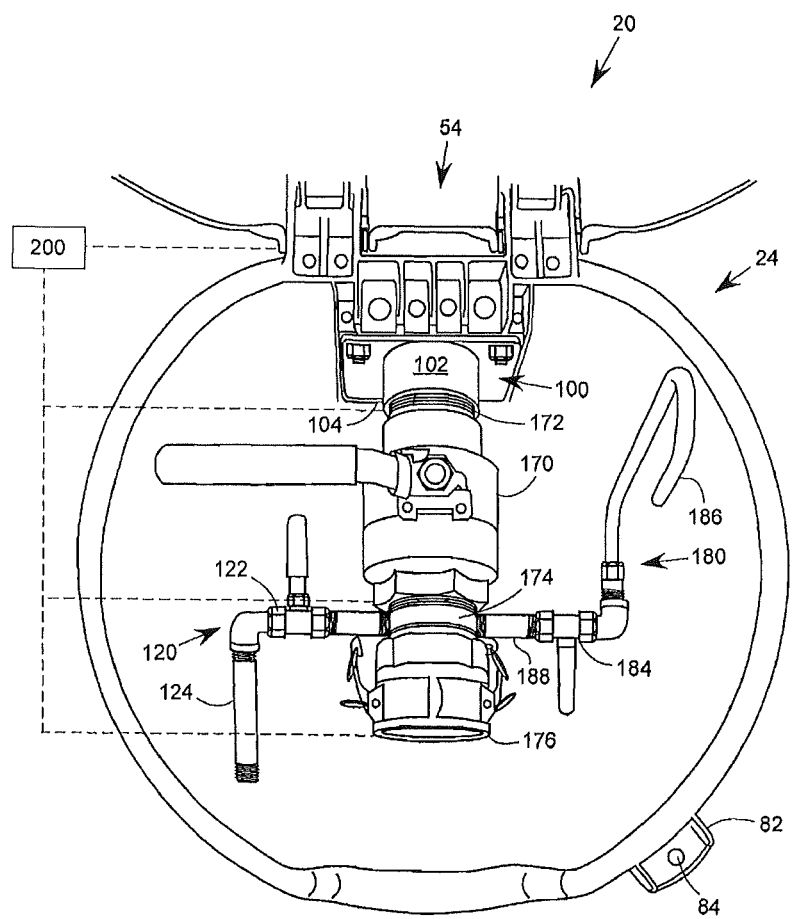
FIG. 13 is a view, with the hinged reservoir cover partially cut away, of the load line connection spillage container according to the present invention in conjunction with optional enclosed main valve, optional cleanout assembly, and optional sampling assembly.

Referring now to FIG. 13, the load line connection spillage container 20 according to the present invention is shown in conjunction with an optional enclosed main valve, an optional cleanout assembly, and an optional sampling assembly. The load line mounting assembly 100 shown in FIGS. 7-9 is secured to the rear upstanding wall portion 54 of the reservoir 24. A main valve 170 is connected at one end to the threaded end 104 of the load line mounting assembly 100 by a pipe fitting 172. A short pipe 174 connects the other end of the main valve 170 to a quick connect fitting 176. On one side of the short pipe 174, an optional cleanout assembly 120 (See FIGS. 8-9) is connected to the short pipe 174 by a threaded bore 178 (not shown) in the wall of the short pipe 174. On the other side of the short pipe 174, an optional sampling assembly 180 is connected to short pipe 174 through a second threaded bore 182 (not shown) in the wall of the short pipe 174.

Still referring to FIG. 13, the sampling assembly 180 includes a valve 184, a goose-neck sample tap 186 attached to one end of the valve 184, and a pipe fitting 188 connecting the other end of the valve 184 to the threaded boar 182 in the wall of the short pipe 174.

It will be understood by one skilled in the art that load line connection spillage container 20, when configured as shown in FIG. 13 with the optional main valve 170, the optional cleanout assembly 120, and the optional sampling assembly 180, offers substantial advantages to oil field operators. With the load line connection spillage container locked, access is restricted to the load line, thereby precluding unauthorized persons from draining the storage tank. The cleanout assembly 120 permits easy removal of liquids from the reservoir 24, and the sampling assembly 180 permits sampling of crude oil or other liquids being transferred from the storage tank to the tank truck.

The load line connection spillage container 20 can be manufactured from any thermoplastic or thermosetting plastic material suitable for injection molding. The most commonly used thermoplastic materials are polystyrene (low cost but lacking the strength and longevity of other materials), ABS or acrylonitrile butadiene styrene (a ter-polymer or mixture of compounds used for everything from toy parts to electronics housings), polyamide (chemically resistant, heat resistant, tough and flexible), polypropylene (tough and flexible), polyethylene (also tough and flexible), and polyvinyl chloride or PVC (more commonly extruded to make pipes, window frames, or wiring insulation where high proportions of plasticizer are added for flexibility). Plastics reinforced with short fibers can also be injection molded.

Referring now to FIGS. 12 and 13, an optional flow meter assembly 200 positioned at a convenient location measures the flow between the storage tank (not shown) and the tank truck (not shown). Many different types and styles of flow meters are well known in the art. In-line flow meters are placed in a transfer line using suitable fittings. New technological breakthroughs have enabled measurement of fluids, including oil and water mixtures, using clamp-on designs. It will be understood by one skilled in the art that the flow meter assembly 200 may be placed either within or without the reservoir 24.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A load line connection spillage container device comprising:
    a reservoir comprising a bottom and an upstanding wall, wherein the upstanding wall comprises a front upstanding wall portion, a rear upstanding wall portion, a left upstanding wall portion and a right upstanding wall portion, and wherein the upstanding wall terminates in a J-shaped lip comprising a sidewall portion and a rollover portion;
    a plurality of gussets positioned between the sidewall portion and the rollover portion of the J-shaped lip;
    a load line throughway in the rear upstanding wall portion;
    a pipe positioned in the load line throughway such that a first portion of the pipe extends away from the reservoir and a second portion of the pipe extends into the reservoir, wherein a first end of the pipe permits coupling to a load line and a second end of the pipe permits coupling to an unloading line;
    a flange attached to the pipe and secured to the rear upstanding wall portion; and wherein the rear upstanding wall portion further comprises a plurality of throughway bores adjacent to the load line throughway and wherein the flange further comprises a plurality of flange bores spaced to align with the throughway bores such that the flange is secured to the rear upstanding wall portion by fasteners disposed through the aligned throughway bores and flange bores;
    a plurality of reinforcing ribs positioned below the load line throughway in the rear upstanding wall portion, wherein the reinforcing ribs extended from the load line throughway towards the bottom of the reservoir so as to strengthen the rear upstanding wall portion such that the pipe can be positioned in the load line throughway and attached to the load line without use of steel collars and saddles, and
    a reservoir cover.

2. The device of claim 1 wherein the reservoir further comprises a lock bracket projecting outward from the J-shaped lip, and wherein the reservoir cover further comprises a lock recess positioned on the reservoir cover such that the lock recess mates with the lock bracket when the reservoir cover is closed.

3. The device of claim 1 wherein the flange is secured to an inner surface of the rear upstanding wall portion.

4. The device of claim 1 wherein the reinforcing ribs extend to the bottom of the reservoir and continue across the bottom of the reservoir so as to strengthen the rear upstanding wall portion such that a pipe can be positioned in the load line throughway and attached to a load line without use of steel collars and saddles.

5. The device of claim 1 wherein at least a portion of the front upstanding wall portion is lower than the rear upstanding wall portion.

6. The device of claim 5 wherein the reservoir cover comprises a lip that fits over the J-shaped lip of the upstanding wall.

7. A load line connection spillage container device comprising:
    a reservoir comprising a bottom and an upstanding wall, wherein the upstanding wall comprises a front upstanding wall portion, a rear upstanding wall portion, a left upstanding wall portion and a right upstanding wall portion, and wherein the upstanding wall terminates in a J-shaped lip comprising a sidewall portion and a rollover portion;
    a plurality of gussets positioned between the sidewall portion and the rollover portion of the J-shaped lip;
    an opening in the rear upstanding wall portion, wherein the rear upstanding wall portion further comprises a plurality of throughway bores adjacent to the opening;
    a pipe positioned in the opening to provide a conduit between a load line and an unloading line, wherein a portion of the pipe extends into the reservoir and a portion of the pipe extends away from the reservoir such that a first end of the pipe is located outside the reservoir and a second end is above the bottom of the reservoir;
    a flange attached to the pipe, wherein the flange is secured to the rear upstanding wall portion, and wherein the flange further comprises a plurality of flange bores spaced to align with the throughway bores such that the flange is secured to the rear upstanding wall portion by fasteners disposed through the aligned throughway bores and flange bores;
    a plurality of reinforcing ribs positioned below the opening in the rear upstanding wall portion, wherein the reinforcing ribs extend from the opening to the bottom of the reservoir, which strengthen the rear upstanding wall portion such that the pipe can be positioned in the opening and attached to the load line without use of steel collars and saddles; and
    a reservoir cover comprising a lip that fits over the J-shaped lip of the upstanding wall.

8. The device of claim 7 wherein at least a portion of the front upstanding wall portion is lower than the rear upstanding wall portion.

9. The device of claim 7 wherein the reservoir further comprises a lock bracket projecting outward from the J-shaped lip, and wherein the reservoir cover further comprises a lock recess positioned on the lip of the reservoir cover such that the lock recess mates with the lock bracket when the reservoir cover is closed.

10. The device of claim 7 wherein the flange is secured to an inner surface of the rear upstanding wall portion.

11. The device of claim 10 wherein at least a portion of the front upstanding wall portion is lower than the opening in the rear upstanding wall portion.

12. The device of claim 7 wherein a first end of the pipe permits coupling to the load line and a second end of the pipe permits coupling to the unloading line.

13. A load line connection spillage container device comprising:
- a reservoir comprising a bottom and an upstanding wall, wherein the upstanding wall comprises a front upstanding wall portion, a rear upstanding wall portion, a left upstanding wall portion and a right upstanding wall portion, wherein at least a portion of the front upstanding wall portion is lower than the rear upstanding wall portion, and wherein the upstanding wall terminates in a J-shaped lip comprising a sidewall portion and a rollover portion;
- a plurality of gussets positioned between the sidewall portion and the rollover portion of the J-shaped lip;
- an opening in the rear upstanding wall portion, wherein the rear upstanding wall portion further comprises a plurality of throughway bores adjacent to the opening;
- a pipe positioned through the opening in the rear upstanding wall portion;
- a plurality of reinforcing ribs positioned below the opening in the rear upstanding wall portion, wherein the reinforcing ribs extend from the opening to the bottom of the reservoir;
- a reservoir cover comprising a lip that fits over the J-shaped lip of the upstanding wall, wherein the reservoir cover is attached to the reservoir by a hinge; and
- a flange attached to the pipe, wherein the flange is secured to the rear upstanding wall portion and wherein the flange further comprises a plurality of flange bores spaced to align with the throughway bores such that the flange is secured to the rear upstanding wall portion by fasteners disposed through the aligned throughway bores and flange bores.

14. The device of claim 13 wherein the reservoir further comprises a lock bracket projecting outward from the J-shaped lip, and wherein the reservoir cover further comprises a lock recess positioned on the lip of the reservoir cover such that the lock recess mates with the lock bracket when the reservoir cover is closed.

15. The device of claim 13 wherein the flange is secured to an inner surface of the rear upstanding wall portion.

16. The device of claim 13 wherein a first end of the pipe permits coupling to a load line and a second end of the pipe permits coupling to an unloading line.

17. The device of claim 13 wherein the portion of the front upstanding wall portion that is lower than the rear upstanding wall portion is a channel.

* * * * *